(12) United States Patent
Kikutsugi

(10) Patent No.: US 8,390,711 B2
(45) Date of Patent: Mar. 5, 2013

(54) SOLID-STATE IMAGING DEVICE WITH TRANSFER SIGNAL USED IN DIFFERENT STATES TO AFFECT RESET AND ACCUMULATION TIMES AND IMAGING APPARATUS INCORPORATING SAME

(75) Inventor: Hirofumi Kikutsugi, Kumamoto (JP)

(73) Assignee: Sony Corporation, Tokyo (JP)

( * ) Notice: Subject to any disclaimer, the term of this patent is extended or adjusted under 35 U.S.C. 154(b) by 343 days.

(21) Appl. No.: 12/796,161

(22) Filed: Jun. 8, 2010

(65) Prior Publication Data

US 2010/0328507 A1 Dec. 30, 2010

(30) Foreign Application Priority Data

Jun. 25, 2009 (JP) ................................. 2009-150826

(51) Int. Cl.
*H04N 3/14* (2006.01)
(52) U.S. Cl. ...................................................... 348/296
(58) Field of Classification Search .................. 348/296
See application file for complete search history.

(56) References Cited

U.S. PATENT DOCUMENTS

| 7,990,451 | B2 * | 8/2011 | Belenky et al. | 348/297 |
| 2009/0086049 | A1 * | 4/2009 | Fujita et al. | 348/222.1 |
| 2009/0284632 | A1 * | 11/2009 | Onuki et al. | 348/302 |

FOREIGN PATENT DOCUMENTS

JP 2008-236634 10/2008

* cited by examiner

*Primary Examiner* — Roberto Velez
*Assistant Examiner* — Gary C Vieaux
(74) *Attorney, Agent, or Firm* — SNR Denton US LLP

(57) ABSTRACT

A solid-state imaging device includes: a pixel area section in which plural pixels having photoelectric conversion sections, in which signal charges are accumulated, are arranged along a horizontal direction and a vertical direction; a vertical scanning unit that selects the pixels of the pixel area section in row units and reads out the signal charges from the pixels in row units; and an electronic shutter unit that supplies a reset signal set in a valid state and a transfer signal set in a valid state to the pixels in row units to reset all the pixels and, then, supplies the transfer signal set in an invalid state to the pixels in row units to release the reset of the pixels and starts accumulation of the signal charges in the pixels.

5 Claims, 8 Drawing Sheets

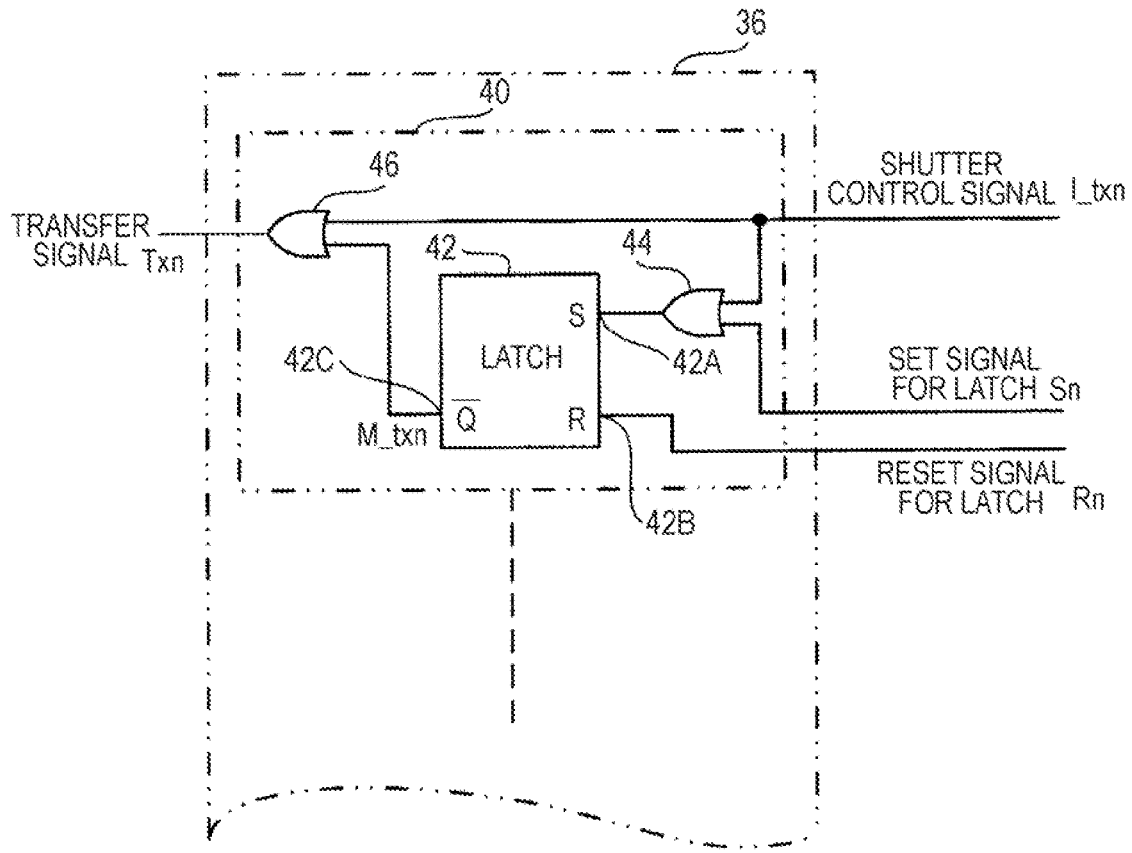

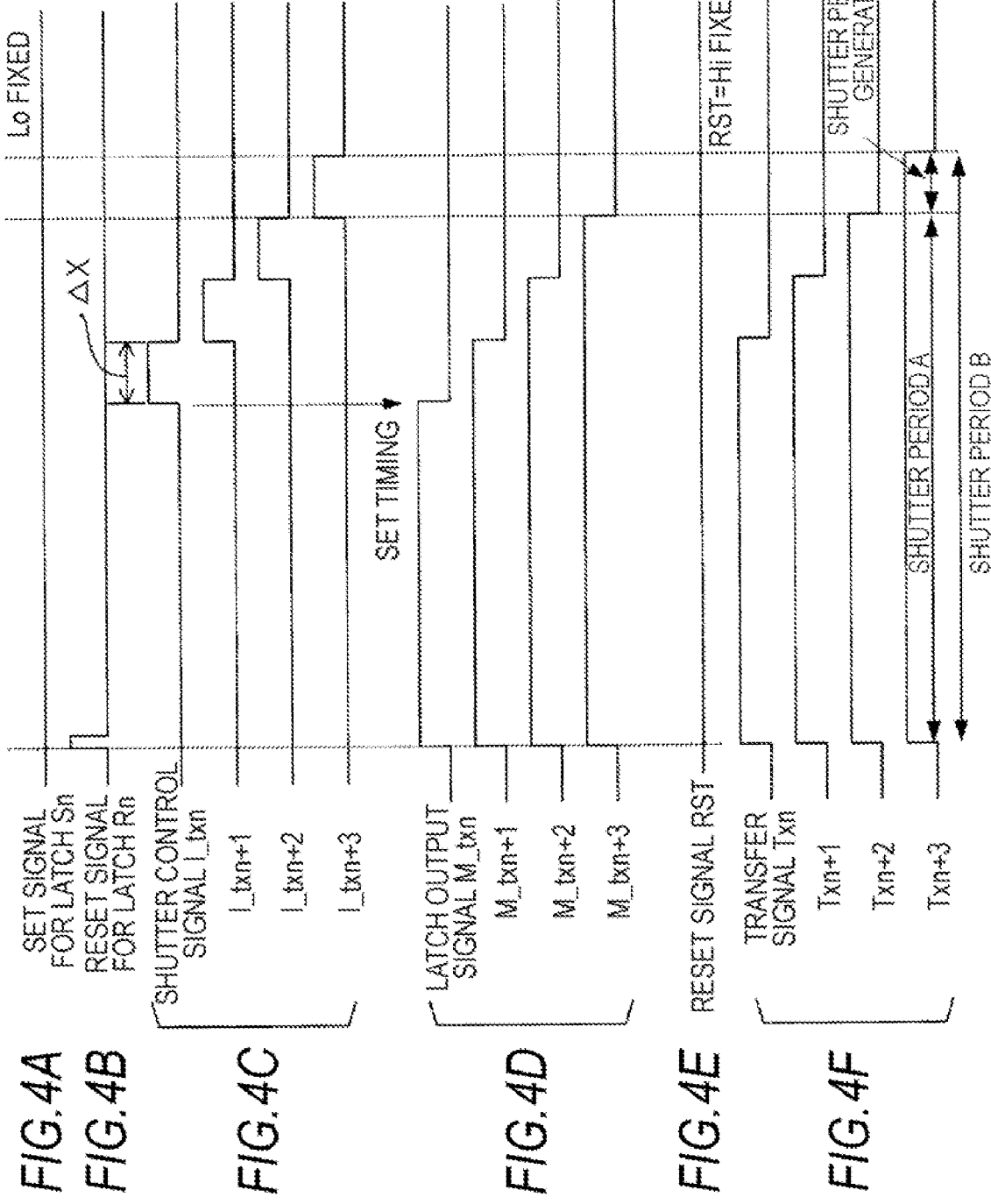

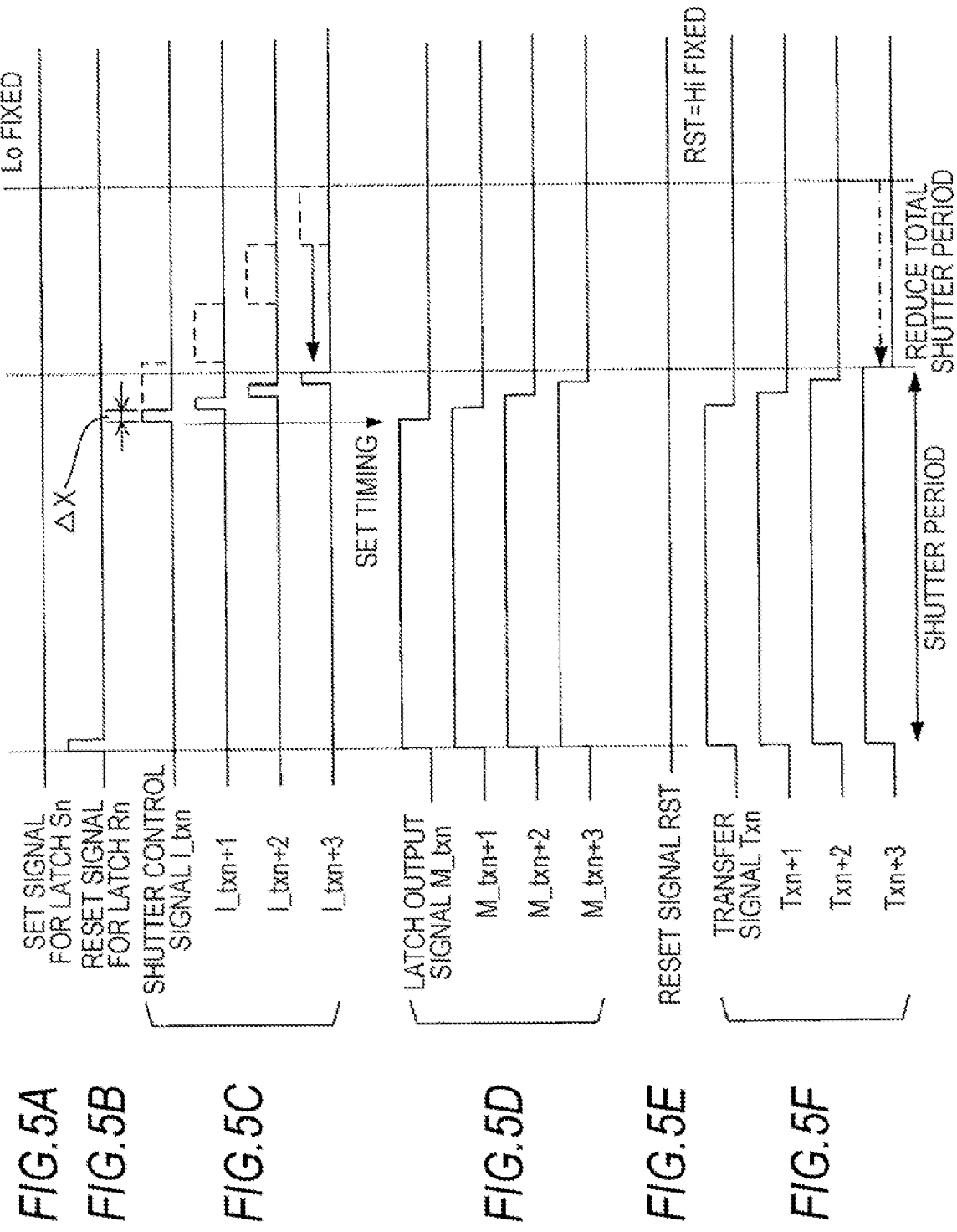

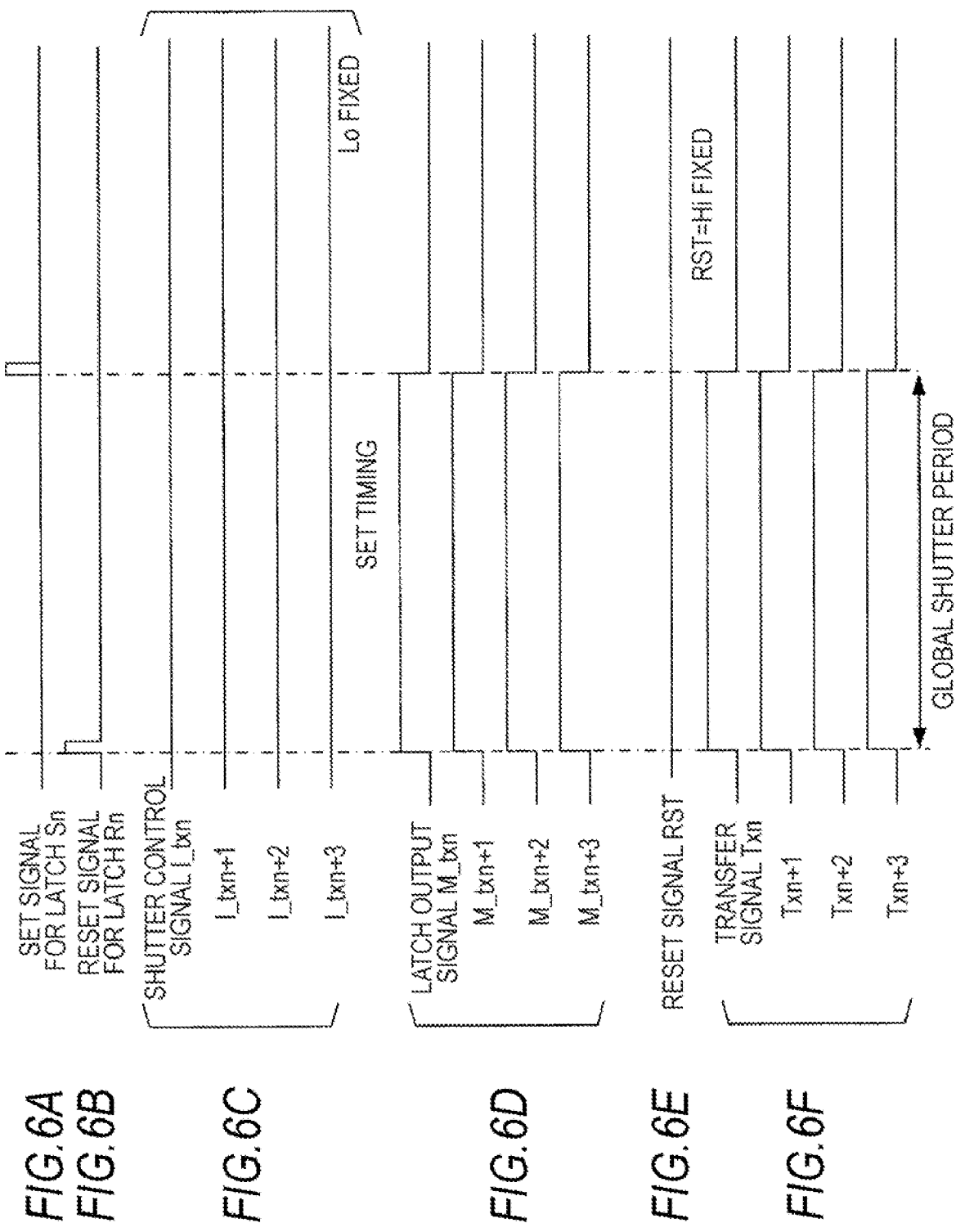

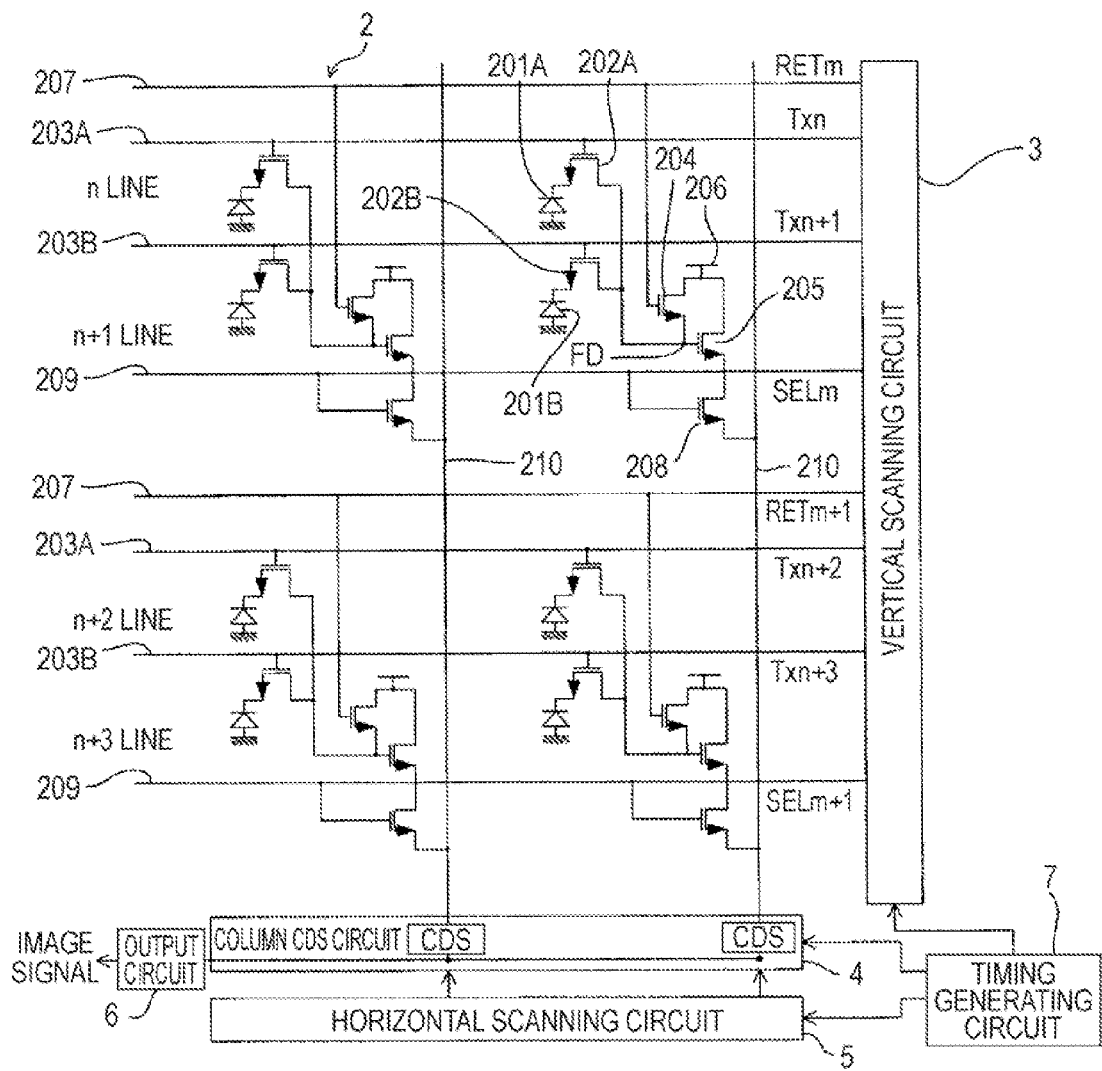
Prior Art  FIG.8

SOLID-STATE IMAGING DEVICE WITH TRANSFER SIGNAL USED IN DIFFERENT STATES TO AFFECT RESET AND ACCUMULATION TIMES AND IMAGING APPARATUS INCORPORATING SAME

BACKGROUND OF THE INVENTION

1. Field of the Invention

The present invention relates to solid-state imaging devices such as a CMOS image sensor and imaging apparatuses including the solid-state imaging devices, and, more particularly to a solid-state imaging device and an imaging apparatus that enable high-speed electronic shutter control.

2. Description of the Related Art

Solid-state imaging devises represented by a CMOS image sensor are used in various camera apparatuses, cellular phones, and the like.

The CMOS image sensor includes a pixel area section in which plural pixels having photoelectric conversion sections formed of photodiodes are arrayed on the same semiconductor substrate in two-dimensional directions and a peripheral circuit area formed on the outside of the pixel area section (see JP-A-2008-236634).

The CMOS image sensor has an electronic shutter function for reading out, when a predetermined time elapses after signal charges accumulated in the photoelectric conversion sections are once reset, the signal charges accumulated in the photoelectric conversion sections to control an accumulation period of the signal charges accumulated in the photoelectric conversion sections.

In other words, the CMOS image sensor once resets, with respect to readout timing, signal charges accumulated in the photoelectric conversion sections before a predetermined accumulation period to accumulate and output only signal charges of light made incident during the predetermined accumulation period.

The CMOS image sensor in the past having the electronic shutter function is explained with reference to FIGS. 8 and 9.

As shown in FIG. 8, the CMOS image sensor includes a pixel area section 2, a vertical scanning circuit 3, a column CDS circuit 4, a horizontal scanning circuit 5, an output circuit 6, and a timing generating circuit 7.

In the pixel area section 2, plural pixels respectively having photoelectric conversion sections are arrayed in two-dimensional directions. The pixel area section 2 receives color component lights corresponding to a spectral characteristic of a color filter arranged above the pixel area section 2 and generates pixel signals corresponding to light amounts.

The vertical scanning circuit 3 scans the pixel area section 2 in row units in the vertical direction (in the column direction).

The column CDS circuit 4 captures the pixel signals of the pixel area section 2 in column units and performs CDS processing and other kinds of signal processing.

The horizontal scanning circuit 5 scans the column CDS circuit 4 in the horizontal direction.

The output circuit 6 applies necessary signal processing to the pixel signals transferred from the column CDS circuit 4 and outputs the pixel signals as image signals.

The timing generating circuit 7 synchronizes operation timings of the vertical scanning circuit 3, the column CDS circuit 4, and the horizontal scanning circuit 5.

In the CMOS image sensor of this example, two pixels adjacent to each other in the vertical direction share a reset transistor, an amplification transistor, and a selection transistor.

Photoelectric conversion sections of the adjacent two pixels are respectively denoted by 201A and 201B.

Sources of transfer transistors 202A and 202B corresponding to the photoelectric conversion sections 201A and 201B are respectively connected thereto.

Transfer lines 203A and 203B are connected to gates of the transfer transistors 202A and 202B.

Drains of the transfer transistors 202A and 202B are connected in common and connected to one reset transistor 204.

A floating diffusion FD between the drains of the transfer transistors 202A and 20B and a source of the reset transistor 204 is connected to a gate of one amplification transistor 205.

A drain of the reset transistor 204 and a drain of the amplification transistor 205 are connected to a power supply line 206.

A gate of the reset transistor 204 is connected to a reset line 207.

A source of the amplification transistor 205 is connected to a drain of a selection transistor 208.

A gate of the selection transistor 208 is connected to a selection line 209. A source of the selection transistor 208 is connected to a vertical signal line 210.

The operation of the electronic shutter of the CMOS image sensor is explained below.

Specifically, the operation of a so-called rolling electronic shutter that resets signal charges of pixels while sequentially scanning the pixels in row units in the vertical direction (the column direction) is explained.

In FIG. 8, signs n, n+1, and the like and suffixes n, n+1, and the like affixed to transfer signals Tx indicate addresses of rows in the vertical direction.

Suffixes m, m+1, and the like affixed to reset signals RET are affixed to respectively distinguish the reset signals RET supplied in two pixels units.

In a row of an address n (hereinafter referred to as n line), as shown in FIG. 8, a reset signal RETm output from the vertical scanning circuit 3 is applied to the reset line 207 while being fixed to "H" and a transfer signal Txn is applied from the vertical scanning circuit 3 to the transfer line 203A as a pulse of positive logic.

Then, the transfer transistor 202A and the reset transistor 204 are turned on and reset operation for removing unnecessary charges accumulated in the photoelectric conversion section 201A in the n line and the floating diffusion FD is performed.

When the transfer transistor 202A is turned off because the transfer signal Txn falls to "L" accumulation of photocharges in the photoelectric conversion section 201A is started from that point. In other words, an accumulation period is started.

Operation same as the operation explained above is also performed in an n+1 line, an n+2 line, an n+3 line, and the like. In other words, shutter target addresses are sequentially selected and the electronic shutter operation is performed.

SUMMARY OF THE INVENTION

In such rolling electronic shutter operation, since the pixels are reset while the rows are scanned in the vertical direction (the column direction), start points of accumulation periods for signal charges in the respective pixels gradually deviate from one another in the vertical direction. In other words, a point when the shutter is opened is gradually delayed.

It is known that, when the deviation among the start points of the accumulation periods in the respective rows occurs in this way, for example, distortion occurs in an image obtained by picking up an image of a moving subject.

The distortion of the image is more conspicuous as the deviation among the start points of the accumulation periods in the respective rows increases.

Therefore, it is desirable to increase speed of the electronic shutter operation in securing the quality of the picked-up image.

When it is attempted to realize the high-speed shutter operation in the CMOS image sensor explained above, as shown in FIG. 9B, the pulse widths of the transfer signals Tx only have to be reduced.

However, a lower limit value of the pulse widths of the transfer signals Tx is limited by wiring resistances and stray capacitances of the transfer lines 203A and 203B. Therefore, there is a limit in realizing the increase in speed of the electronic shutter operation.

Therefore, it is desirable to provide a solid-state imaging device and an imaging apparatus that are advantageous in realizing the increase in speed of the electronic shutter operation.

According to an embodiment of the present invention, there is provided a solid-state imaging device including: a pixel area section in which plural pixels having photoelectric conversion sections, in which signal charges are accumulated, are arranged along the horizontal direction and the vertical direction; a vertical scanning unit that selects the pixels of the pixel area section in row units and reads out the signal charges from the pixels in row units; and an electronic shutter unit that supplies a reset signal set in a valid state and a transfer signal set in a valid state to the pixels in row units to reset all the pixels and, then, supplies the transfer signal set in an invalid state to the pixels in row units to release the reset of the pixels and starts accumulation of the signal charges in the pixels.

According to another embodiment of the present invention, there is provided an imaging apparatus including: an imaging unit including a solid-state imaging device; a control unit that controls the imaging unit; and an operation unit for operating the imaging unit, wherein the solid-stage imaging device includes: a pixel area section in which plural pixels having photoelectric conversion sections, in which signal charges are accumulated, are arranged along the horizontal direction and the vertical direction; a vertical scanning unit that selects the pixels of the pixel area section in row units and reads out the signal charges from the pixels in row units; and an electronic shutter unit that supplies a reset signal set in a valid state and a transfer signal set in a valid state to the pixels in row units to reset all the pixels and, then, supplies the transfer signal set in an invalid state to the pixels in row units to release the reset of the pixels and starts accumulation of the signal charges in the pixels.

According to the embodiments of the present invention, the pixels can be reset by switching the transfer signal from the valid state to the invalid state. Therefore, unlike the past, it is unnecessary to take into account the limitation of a lower limit value of pulse widths of transfer signals due to wiring resistances and stray capacitances of transfer lines.

Therefore, it is possible to reduce the deviation among the start points of accumulation periods in the respective rows. This is advantageous in realizing the increase in speed of the electronic shutter operation. Further, it is possible to suppress occurrence of distortion in an image obtained by picking up a moving subject. This is advantageous in securing the quality of the picked-up image.

BRIEF DESCRIPTION OF THE DRAWINGS

FIG. 2 is a circuit diagram of the configuration of a memory block;

FIG. 3 is a diagram for explaining a relation between an input signal and an output signal of a latch;

FIGS. 4A to 4F are signal waveform charts for explaining rolling electronic shutter operation of the solid-state imaging device according to the embodiment;

FIGS. 5A to 5F are signal waveform charts for explaining an increase in speed of the rolling electronic shutter operation of the solid-state imaging device according to the embodiment;

FIGS. 6A to 6F are signal waveform charts for explaining global electronic shutter operation of the solid-state imaging device according to the embodiment;

FIG. 8 is a diagram of the configuration of a CMOS image sensor in an example in the past.

DESCRIPTION OF THE PREFERRED EMBODIMENTS

An embodiment of the present invention is explained below with reference to FIGS. 1 to 6.

In the following explanation, a solid-state imaging device 10 according to the embodiment includes a CMOS image sensor.

Figure 1:
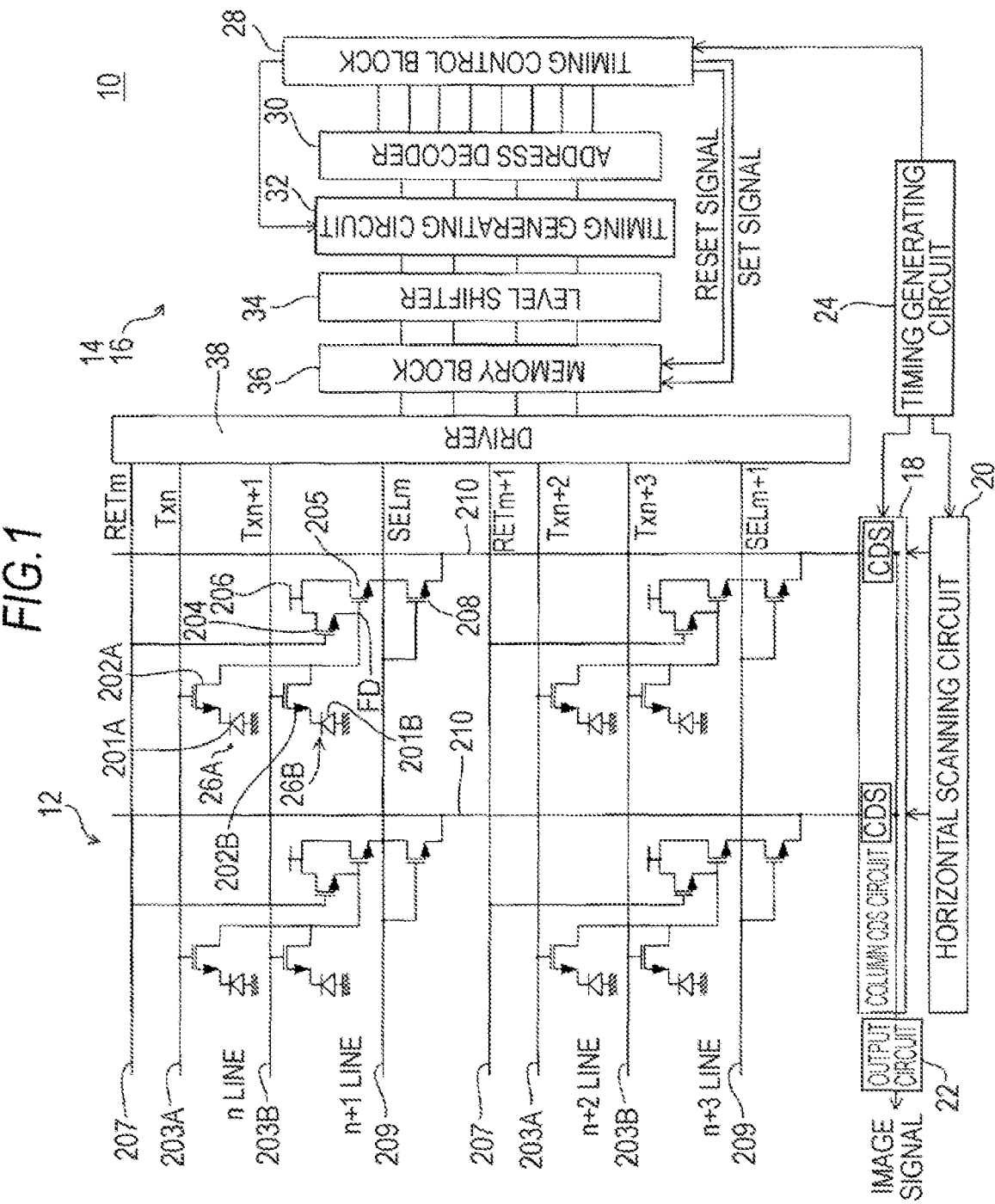
FIG. 1 is a diagram of the configuration of a solid-state imaging device according to an embodiment of the present invention.

As shown in FIG. 1, the solid-state imaging device 10 includes a pixel area section 12, a vertical scanning unit (a column scanning unit) 14, an electronic shutter unit 16, a column CDS circuit 18, a horizontal scanning unit (a row scanning unit) 20, an output circuit 22, and a timing generating circuit 24.

The pixel area section 12 is a section in which plural pixels having photoelectric conversion sections formed of photodiodes are arranged along the horizontal direction and the vertical direction.

In this embodiment, two pixels adjacent to each other in the vertical direction separately have photoelectric conversion sections and transfer transistors and share a reset transistor, an amplification transistor, and a selection transistor.

One of the two pixels adjacent to each other in the vertical direction is denoted by reference signal 26A and the other is denoted by reference sign 26B.

One pixel 26A includes a photoelectric conversion section 201A, a transfer transistor 202A, a reset transistor 204, an amplification transistor 205, and a selection transistor 208.

The other pixel 26B includes a photoelectric conversion section 201B, a transfer transistor 202B, the reset transistor 204, the amplification transistor 205, and the selection transistor 208.

In the following explanation, the transfer transistors 202A and 202B, the reset transistor 204, the amplification transistor 205, and the selection transistor 208 are collectively referred to as pixel transistor.

In this embodiment, as explained above, the adjacent two pixels share the transistors excluding the transfer transistors. However, the present invention can also be applied regardless of whether an independent transistor is used for each of the pixels or three or more pixels share the transistors excluding the transfer transistors.

The transfer transistors 202A and 202B read out signal charges of the photoelectric conversion sections 201A and 201B to a floating diffusion FD.

The reset transistor 204 resets the floating diffusion FD.

The amplification transistor 205 generates a pixel signal corresponding to the potential of the floating diffusion FD.

The selection transistor 208 selects a pixel that outputs the pixel signal.

The sources of the transfer transistors 202A and 202B corresponding to output ends (cathodes) of the photoelectric conversion sections 201A and 201B are respectively connected thereto.

The transfer lines 203A and 203B are respectively connected to the gates of the transfer transistors 202A and 202B.

The drains of the transfer transistors 202A and 202B are connected in common and connected to the reset transistor 204.

The floating diffusion FD between the drains of the transfer transistors 202A and 202B and the source of the reset transistor 204 are connected to the gate of the amplification transistor 205.

The drain of the reset transistor 204 and the drain of the amplification transistor 205 are connected to the power supply line 206.

The gate of the reset transistor 204 is connected to the reset line 207.

The source of the amplification transistor 205 is connected to the drain of the selection transistor 208.

The gate of the selection transistor 208 is connected to the selection line 209 and the source of the selection transistor 208 is connected to the vertical signal line 210.

The column CDS circuit 18 captures pixel signals of the pixel area section 12 in column units and perform CDS processing and other kinds of signal processing.

The horizontal scanning circuit 20 scans the column CDS circuit 18 in the horizontal direction. In other words, the horizontal scanning circuit 20 applies, in column units, signal processing to pixel signals read out by the vertical scanning unit 14 in row units.

The output circuit 22 applies necessary signal processing to the pixel signals transferred from the column CDS circuit 18 and outputs the pixel signals as image signals.

The timing generating circuit 24 synchronizes operation timings of the vertical scanning unit 14, the electronic shutter unit 16, the column CDS circuit 18, and the horizontal scanning circuit 20.

The vertical scanning unit 14 selects the pixels of the pixel area section 12 in row units and reads out signal charges from the pixels in row units. In other words, the vertical scanning unit 14 selects the pixels of the pixel area section 12 in row units and performs control of the pixels.

The vertical scanning unit 14 includes a timing control block 28, an address decoder 30, a timing generating circuit 32, a level shifter 34, a memory block 36, and a driver 38.

The timing control block 28 generates various pulse signals for generating a reset signal RET, a transfer signal Tx, and a selection signal SEL explained later and supplies the pulse signals to the timing generating circuit 32.

The timing control block 28 generates various pulse signals for sequentially generating a shutter control signal I_txn, a set signal for latch Sn, and a reset signal for latch Rn shown in FIG. 2 and supplies the pulse signals to the timing generating circuit 32.

Further, the timing control block 28 supplies address data for specifying a row in the pixel area section 12 to the address decoder 30.

The address decoder 30 decodes the address data supplied from the timing control block 28 and specifies the row in the pixel area section 12.

The timing generating circuit 32 generates the reset signal RET, the transfer signal Tx, the selection signal SEL, the shutter control signal I_txn, the set signal for latch Sn, and the reset signal for latch Rn on the basis of the various pulse signals supplied from the timing control block 28. The timing generating circuit 32 supplies the signals to the row specified by the address decoder 30.

The level shifter 34 levels up the voltages of the reset signal RET, the transfer signal Tx, and the selection signal SEL supplied from the timing generating circuit 32 to voltage sufficient for driving the memory block 34 or the driver 38 in the post-stage.

The memory block 36 configures a part of the electronic shutter unit 16. The memory block 36 generates a transfer signal Txn on the basis of the shutter control signal I_txn, the set signal for latch Sn, and the reset signal for latch Rn.

The memory block 36 is explained in detail later.

The driver 38 supplies the reset signal RET, the transfer signal Tx, and the selection signal SEL, which are supplied from the level shifter 34 via the memory block 36, to the pixel transistors and drives the pixel transistors.

The electronic shutter unit 16 supplies a reset signal RST set in a valid state and the transfer signal Txn set in the valid state to the pixels in row units to reset all the pixels. After resetting all the pixels, the electronic shutter unit 16 supplies the transfer signal Txn set in an invalid state to the pixels to release the reset of the pixels and starts accumulation of signal charges in the pixels.

The electronic shutter unit 16 includes the timing control block 28, the address decoder 30, the timing generating circuit 32, the level shifter 34, the memory block 36, and the driver 38.

The memory block 36 configuring a part of the electronic shutter unit 16 is explained in detail below.

As shown in FIG. 2, the memory block 36 includes plural transfer-signal generating circuits 40 provided in transfer line 203A (203B) units, i.e., row units.

In this embodiment, each of the transfer-signal generating circuits 40 includes a latch 42, a first OR gate 44, and a second OR gate 46.

In this embodiment, the latch 42 has a set input terminal 42A of positive logic, a reset input terminal 42B of positive logic, and an output terminal 42C of negative logic.

FIG. 3 is a diagram for explaining a relation among a set signal S input to the set input terminal 42A, a reset signal R input to the reset input terminal 42B, and an output signal Q bar of the output terminal 42C.

As shown in FIG. 3, the latch 42 holds the output signal Q bar at "0" when the set signal S is "1" and holds the output signal Q bar at "1" when the reset signal R is "1".

In other words, the latch 42 holds the output signal Q bar at "L" when the set signal S is supplied and holds the output signal Q bar at "H" when the reset signal R is supplied.

Such a latch 42 corresponds to a memory that stores data of one bit.

As shown in FIG. 2, the shutter control signal I_txn of positive logic supplied from the timing generating circuit 32 and the set signal for latch Sn of positive logic supplied from the timing generating circuit 32 are input to the first OR gate 44.

An output terminal of the first OR gate 44 is connected to the set input terminal 42A of the latch 42.

Therefore, an OR of the shutter control signal I_txn and the set signal for latch Sn is supplied to the set input terminal 42A of the latch 42.

The shutter control signal I_txn and the output signal Q bar of the output terminal 42C of the latch 42 are input to the second OR gate 46. For convenience of explanation, the output signal Q bar is referred to as latch output signal M_txn below.

The second OR gate 46 outputs an OR of the shutter control signal I_txn and the latch output signal M_txn as the transfer signal Txn.

Therefore, the transfer-signal generating circuit 40 includes the latch 42 that is set by the OR of the shutter control signal I_txn and the set signal for latch Sn and reset by the reset signal for latch Rn. The transfer-signal generating circuit 40 generates the transfer signal Txn on the basis of an output signal of the latch 42.

The transfer signal Txn is formed by the OR of the shutter control signal I_txn and the latch output signal M_txn.

Rolling electronic shutter operation of the solid-state imaging device 10 according to this embodiment is explained with reference to FIGS. 4A to 4F. In the following explanation, a signal level is explained in positive logic. Therefore, "L" corresponds to "0" and "H" corresponds to "1".

As shown in FIG. 4E, the timing generating circuit 32 fixes the reset signal RST to "H" in advance.

As shown in FIGS. 4A to 4C, the electronic shutter unit 16 simultaneously supplies the reset signal for latch Rn to the transfer-signal generating circuits 40 as a pulse signal of positive logic in a state in which the set signal for latch Sn is fixed to "L" and shutter control signals I_txn and the like are set to "L".

Then, as shown in FIG. 4D, latch output signals M_txn and the like of the transfer-signal generating circuits 40 simultaneously transition to "H". Therefore, as shown in FIG. 4F, transfer signals Txn and the like also simultaneously transition to "H".

Consequently, all the pixels in the rows are simultaneously reset. In other words, a shutter period in which an electronic shutter is applied is started.

Specifically, the electronic shutter unit 16 supplies the reset signal RST set in the valid state and the transfer signals Txn and the like set in the valid state to the pixels in row units to reset all the pixels.

In this case, the reset of the pixels by the electronic shutter unit 16 is simultaneously executed on all the pixels.

Subsequently, as shown in FIG. 4C, the electronic shutter unit 16 sequentially outputs shutter control signals I_txn, I_txn+1, and the like to the transfer-signal generating circuits 40 as pulse signals of positive logic.

Pulse widths ΔX of the shutter control signals I_txn and the like are the same. A point when a temporally-preceding shutter control signal rises and a point when the next shutter control signal rises coincide with each other.

As shown in FIG. 4D, when the shutter control signals I_txn and the like sequentially transition to "H", the latch output signals M_txn and the like sequentially transition from "H" to "L".

Therefore, as shown in FIG. 4F, the transfer signals Txn and the like fall with a delay of the pulse widths ΔX with respect to falling points of the latch output signals M_txn and the like.

In FIG. 4F, a shutter period A indicates shutter periods set by the falling points of the latch output signals M_txn and the like and a shutter period B indicates actual shutter periods obtained by adding the pulse widths ΔX to the shutter period A.

Consequently, the reset of the pixels is sequentially released in row units and accumulation of signal charges in the photoelectric conversion sections 26A and 26B of the pixels is started. In other words, an accumulation period is started.

Specifically, after resetting the pixels, the electronic shutter unit 16 supplies the transfer signals Txn and the like set in the invalid state to the pixels in row units to release the reset of the pixels and starts accumulation of signal charges in the pixels.

In this case, the release of the reset of the pixels by the electronic shutter unit 16 is sequentially executed on the pixels in row units.

Therefore, as shown in FIGS. 4A to 4F, it is seen that the shutter period B in the rows of the pixel area section 12 deviates (delays) in pulse width ΔX units.

Specifically, if the number of rows of the pixel area section 12 is N, an amount of deviation of the shutter period B between the first row and the last row is ΔX×(N−1).

An increase in speed of electronic shutter operation is explained below with reference to FIGS. 5A to 5F.

In order to increase speed of the electronic shutter operation, as indicated by broken lines in FIG. 5C, the pulse widths ΔX of the shutter control signals I_txn, I_txn+1, and the like only have to be reduced.

A lower limit value of the pulse widths ΔX of the shutter control signals I_txn, I_txn+1, and the like only has to be time enough for the transfer-signal generating circuit 40 to normally operate.

Specifically, in the past, a lower limit value of the pulse widths of the transfer signals Tx is limited by wiring resistances and stray capacitances of the transfer lines 203A and 203B.

On the other hand, in this embodiment, it is sufficient to secure the pulse widths ΔX of shutter control signals enough for actuating the transfer-signal generating circuit 40, i.e., a gate circuit including the latch 42, the first OR gate 44, and the second OR gate 46.

When this is represented with one clock of a clock signal for operation of the vertical scanning unit 14 set as a unit, whereas, in the past, about ten clocks are necessary as the pulse widths of the transfer signals Tx, in this embodiment, for example, two clocks are sufficient as the pulse widths ΔX of the shutter control signals.

Therefore, it is possible to reduce the amount of deviation of the shutter period B to about ⅕. This is extremely advantageous in realizing the increase in speed of the electronic shutter operation.

Global electronic shutter operation is explained below with reference to FIGS. 6A to 6F.

The global electronic shutter operation means electronic shutter operation for setting shutter periods for all the pixels of the pixel area section 12 the same. In other words, since deviation among the shutter periods is zero, accumulation periods are started at the same timing.

As shown in FIG. 6E, the timing generating circuit 32 fixes the reset signal RST to "H" in advance.

As shown in FIGS. 6A to 6C, the electronic shutter unit 16 once sets the set signal for latch Sn to "L". The electronic shutter unit 16 simultaneously outputs the reset signal for latch Rn to the transfer-signal generating circuits 40 as a pulse signal of positive logic in a state in which the shutter control signals I_txn and the like are fixed to "L".

Then, as shown in FIG. 6D, the latch output signals M_txn, M_txn+1, and the like of the transfer-signal generating circuits 40 simultaneously transition to "H". Therefore, as shown in FIG. 6F, the transfer signals Txn, Txn+1, and the like also simultaneously transition to "H".

Consequently, all the pixels in the rows are simultaneously reset. In other words, a shutter period in which an electronic shutter is applied is started.

Specifically, the electronic shutter unit 16 supplies the reset signal RST set in the valid state and the transfer signals Txn and the like set in the valid state to the pixels in row units to reset all the pixels.

In this case, the reset of the pixels by the electronic shutter unit 16 is simultaneously executed on all the pixels.

Subsequently, as shown in FIGS. 6A, 6B and 6E, the electronic shutter unit 16 sets the reset signal for latch Rn in the invalid state in a state in which the reset signal RST is supplied to pixels in row units selected by the vertical scanning unit 14. In that state, the electronic shutter unit 16 simultaneously supplies the set signal for latch Sn to the transfer-signal generating circuits 40 as a pulse signal of positive logic.

At a point when the set signal for latch Sn rises from "L" to "H", the latch output signals M_txn, M_txn+1, and the like simultaneously fall to "L".

Since the shutter control signals I_txn, I_txn+1, and the like are fixed to "L", the transfer signals Txn, Txn+1, and the like as output signals of the second OR gate 46 shown in FIG. 2 simultaneously fall from "H" to "L".

Consequently, the reset of all the pixels is simultaneously released.

Specifically, after resetting the pixels, the electronic shutter unit 16 supplies the transfer signals Txn and the like set in the invalid state to the pixels in row units to release the reset of the pixels and starts accumulation of signal charges in the pixels.

In this case, the release of the reset of the pixels by the electronic shutter unit 16 is simultaneously executed on all the pixels.

Therefore, all shutter periods (global shutter periods) of all the pixels are the same and accumulation periods for signal charges are started at the same timing.

In this case, since deviation between shutter periods in rows is zero, it is possible to prevent distortion from occurring in an image obtained by picking up an image of a moving subject. This is advantageous in securing the quality of the picked-up image.

In order to realize the global electronic shutter operation, transfer signals only have to be simultaneously supplied to all the pixels. However, in the past, in order to generate such transfer signals, it is necessary to provide a gate circuit exclusively used for the global electronic shutter operation.

Therefore, there is disadvantage in realizing a reduction in size and a reduction in cost of the solid-state imaging device 10.

On the other hand, in this embodiment, it is possible to realize the global electronic shutter operation with a simple configuration in which the transfer-signal generating circuits 40 are provided in row units. This is remarkably advantageous in realizing the reduction in size and the reduction in cost of the solid-state imaging device 10.

According to this embodiment, the electronic shutter unit 16 supplies a reset signal set in the valid state and transfer signals set in the valid state to the pixels in row units to reset all the pixels. Thereafter, the electronic shutter unit 16 supplies transfer signals set in the invalid state to the pixels to release the reset of the pixels and starts accumulation of signal charges in the pixels.

Therefore, since the pixels can be reset by switching the transfer signals from the valid state to the invalid state, unlike the past, it is unnecessary to take into account limitation of a lower limit value of the pulse widths of the transfer signals Tx due to wiring resistances and stray capacitances of the transfer lines 203A and 203B.

Therefore, it is possible to reduce deviation among the start points of the accumulation periods in the rows. In other words, it is possible to reduce deviation among shutter periods that occurs in row units.

This is advantageous in realizing an increase in speed of the electronic shutter operation. It is possible to suppress distortion from occurring in an image obtained by picking up an image of a moving subject. This is advantageous in securing the quality of the picked-up image.

In this embodiment, in the electronic shutter unit 16, the transfer-signal generating circuit 40 having the latch 42 is provided in row units.

The latch 42 is set by an OR of the shutter control signal I_txn and the set signal for latch Sn and reset by the reset signal for latch Rn.

The transfer-signal generating circuit 40 generates the transfer signal Txn with an OR of the shutter control signal I_txn and the latch output signal M_txn.

Therefore, in order to transition the transfer signal Txn from the valid state to the invalid state, the shutter control signal I_txn having short pulse width enough for the transfer-signal generating circuit 40 including the latch 42 to operate only has to be sequentially supplied to the transfer-signal generating circuits 40 in the rows.

Therefore, it is possible to reduce deviation among the start points of the accumulation periods in the rows. In other words, it is possible to reduce deviation among shutter periods that occurs in row units.

Here, the pulse width of the shutter control signal I_txn that is enough for operating the transfer-signal generating circuit 40 is sufficient. Therefore, it is possible to reduce deviation among the start points of the accumulation periods in the rows. In other words, it is possible to reduce deviation among shutter periods that occurs in row units.

Therefore, it is possible to realize an increase in speed of the electronic shutter operation with a simple configuration in which the transfer-signal generating circuits 40 are provided in the electronic shutter unit 16. This is advantageous in securing the quality of a picked-up image while reducing cost.

According to this embodiment, it is possible to simply realize the global electronic shutter operation as explained above.

However, when the global electronic shutter operation is performed, as shown in FIGS. 6A, 6D and 6F, the latch output signals and the transfer signals simultaneously fall when the pulse signal of the set signal for latch Sn rises. Therefore, power consumption instantaneously increases.

Therefore, it is necessary to take into account such an increase in power consumption when peripheral circuits included in the solid-state imaging device 10 are designed. There is a concern that an increase in design cost is caused.

On the other hand, if an increase in speed of the rolling electronic shutter operation is realized, it is possible to obtain an effect close to that realized when the global electronic shutter operation is performed. Moreover, it is unnecessary to take into account the increase in power consumption. This is advantageous in realizing a reduction in design cost.

It is conceivable to use the solid-state imaging device 10 for an imaging apparatus such as a digital still camera and display a subject image picked up by the solid-state imaging device 10 on a display in a form of a moving image.

In this case, since there is a limit in transfer speed for reading out an image signal from the solid-state imaging device 10, it is necessary to read out all the pixels of the solid-state imaging device 10 while thinning out the pixels in row units.

Specifically, rows from which image signals are not read out are set for every predetermined row.

However, charges are accumulated and saturated in pixels of the rows from which image signals are not read out. Therefore, it is necessary to control the pixels in the rows, from which image signals are not read out, to a state in which a shutter is applied thereto (a reset state).

Therefore, a gate circuit that performs such dedicated control has to be provided in row units. There is an inconvenience that complication of the configuration and an increase in size and an increase in cost of the solid-state imaging device 10 are caused.

However, in this embodiment, it is possible to control the reset state of the pixels in row units simply by controlling the set signal for latch Sn and the shutter control signal I_txn supplied to the transfer-signal generating circuits 40. Therefore, it is possible to realize simplification of the configuration. This is advantageous in realizing the reduction in size and the reduction in cost of the solid-state imaging device 10.

It is possible to variously change the electronic shutter operation simply by variously changing the set signal for latch Sn and the shutter control signal I_txn supplied to the transfer-signal generating circuits 40.

Therefore, since it is unnecessary to provide dedicated gate circuits in a number corresponding to types of the electronic shutter operation. This is advantageous in easily realizing various kinds of electronic shutter operation while realizing the simplification of the configuration and the reduction in size and the reduction in cost of the solid-state imaging device 10.

When the solid-state imaging device 10 is used for an imaging apparatus such as a digital still camera, it is conceivable to combine an electronic shutter function of the solid-state imaging device 10 and a focal plane shutter.

The focal plane shutter moves a light blocking plate provided in the front of the solid-state imaging device 10 in parallel to the vertical direction (the column direction) of the solid-state imaging device 10.

Since the focal plane shutter is mechanically driven, the moving speed of the light blocking plate is not constant and increases as time elapses. Specifically, the moving speed of the light blocking plate is low at the start of movement, increases as the movement progresses, and reaches highest speed at the end of the movement.

On the other hand, when the rolling electronic shutter operation is performed, deviation among the start timings of the accumulation periods of the pixels in row units that occurs in the vertical direction linearly increases.

Therefore, when the rolling electronic shutter operation and the focal plane shutter are used in combination, there is a concern that a change in the moving speed of the light blocking plate affects a picked-up image.

Therefore, it is conceivable to control the deviation among the start timings of the accumulation periods of the pixels in row units that occurs in the vertical direction such that the change in the moving speed of the light blocking plate is suppressed from affecting the image. In other words, it is possible to control the deviation among the start timings of the accumulation periods of the pixels in row units to nonlinearly increase.

In order to control the deviation among the start timings of the accumulation periods of the pixels in row units to nonlinearly increase, the pulse width ΔX of the shutter control signal I_txn only has to be set nonlinear.

In this case, it is also unnecessary to provide a dedicated gate circuit in order to control the deviation among the start timings of the accumulation periods of the pixels in row units to nonlinearly increase. This is advantageous in realizing the simplification of the configuration and the reduction in size and the reduction in cost of the solid-state imaging device 10.

The solid-state imaging device 10 according to this embodiment applied to an imaging apparatus such as a digital still camera is explained with reference to FIG. 7.

Figure 7:
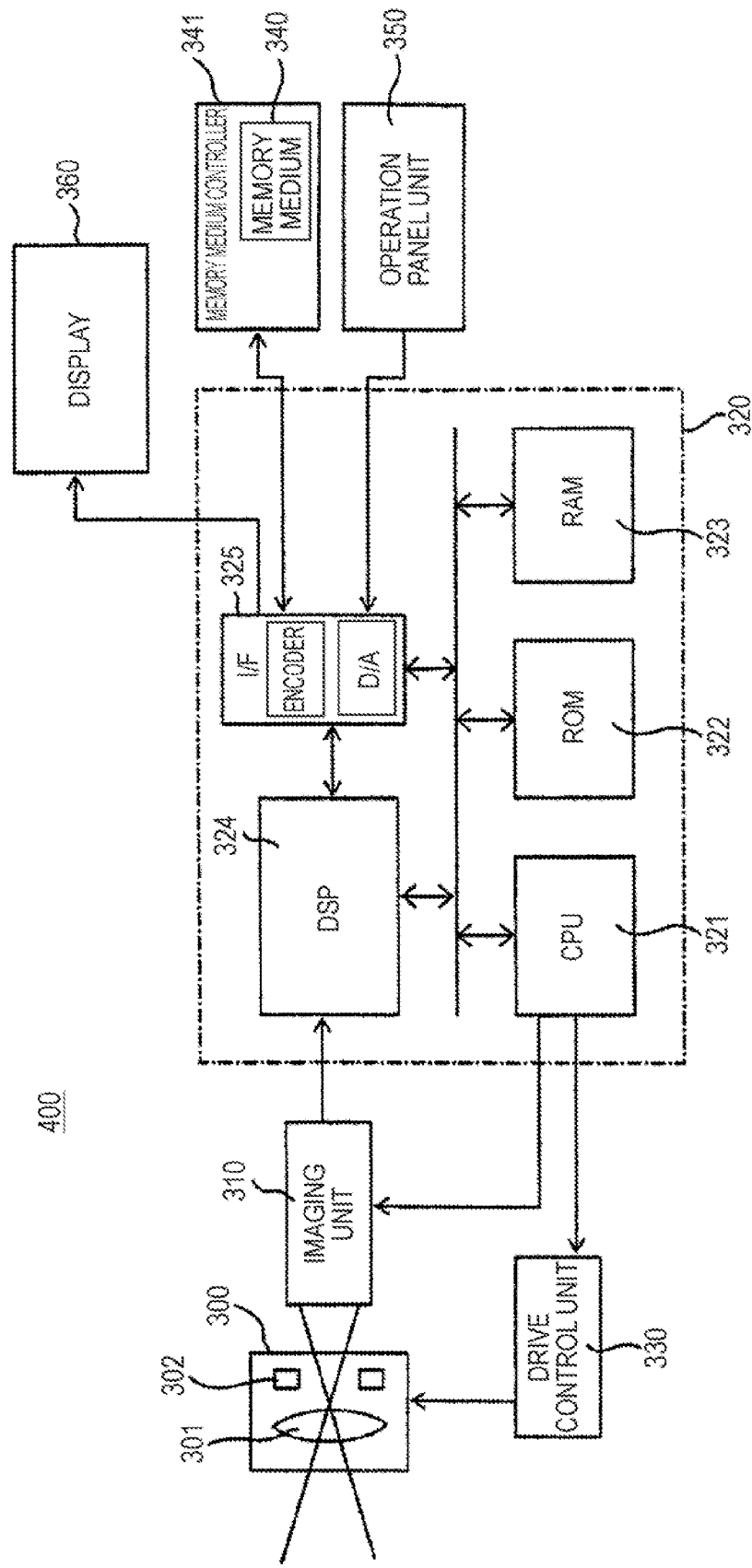
FIG. 7 is a block diagram of the configuration of an imaging apparatus including the solid-state imaging device according to the embodiment.
Figure 9A:
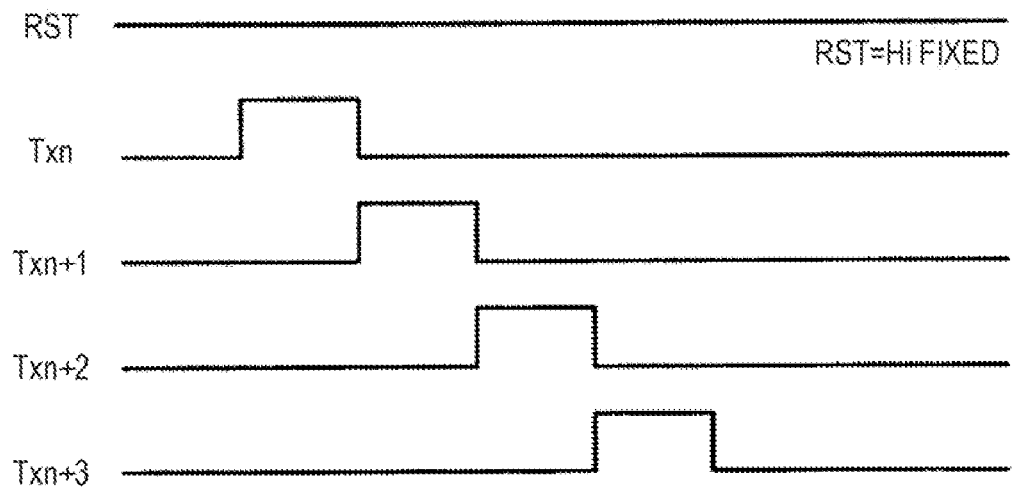
FIG. 9A is a signal waveform chart for explaining electronic shutter operation in the CMOS image sensor in the past.
Figure 9B:
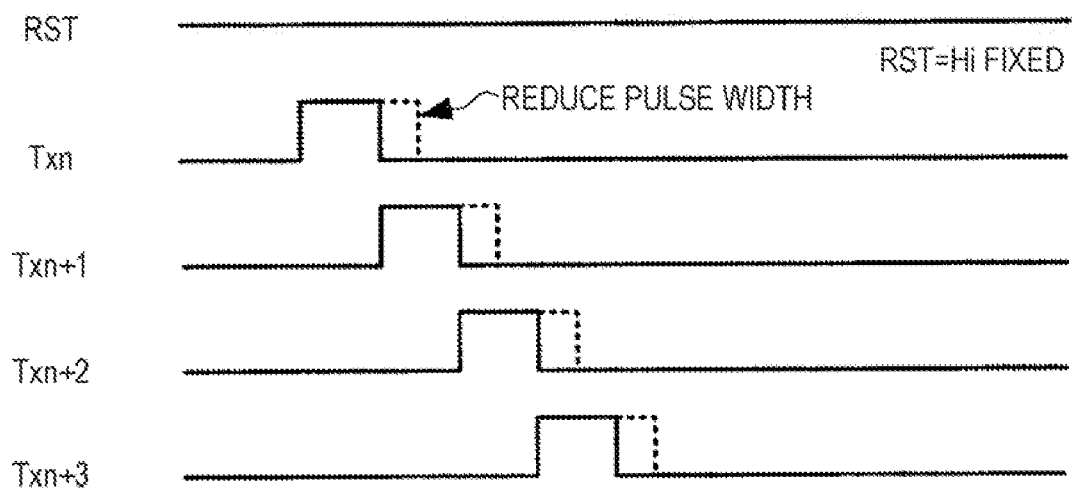
FIG. 9B is a signal waveform chart for explaining an increase in speed of the electronic shutter operation.

As shown in FIG. 7, an imaging apparatus 400 includes an imaging optical system 300, an imaging unit 310, a system control unit 320, a drive control unit 330, a memory medium 340, a scanning panel unit 350, and a display 360.

The imaging optical system 300 includes a zoom lens 301 arranged in a lens barrel and a stop mechanism 302. The imaging optical system 300 focuses a subject image on a light receiving unit of an image sensor.

The imaging optical system 300 mechanically drives units thereof to perform control of auto focus and the like according to the control by the drive control unit 330 based on an instruction of the system control unit 320.

The imaging unit 310 performs imaging of a subject using the solid-state imaging device 10 shown in FIG. 1. The imaging unit 310 outputs an imaging signal (an image signal) to the system control unit 320 mounted on a main substrate.

Specifically, the imaging unit 310 applies processing such as AGC (automatic gain control), OB (optical black) clamp, CDS (correlated double sampling), and A/D conversion to an output signal of the image sensor and generates and outputs a digital imaging signal.

The system control unit 320 includes a CPU 321, a ROM 322, a RAM 323, a DSP 324, and an external interface 325.

The CPU 321 sends instructions to the units of the imaging apparatus 400 using the ROM 322 and the RAM 323 and performs control of the entire system.

The DSP 324 applies various kinds of signal processing to the imaging signal from the imaging unit 310 to thereby generate a video signal (e.g., a YUV signal) of a still image or a moving image in a predetermined format.

The external interface 325 includes various encoders and a D/A converter. The external interface 325 exchanges various control signals and data with external components (in this example, the display 360, the memory medium 340, and the operation panel unit 350) connected to the system control unit 320.

The memory medium 340 is a memory medium such as various memory cards that can appropriately store photographed images. The memory medium 340 can be replaced with respect to, for example, a memory medium controller 341. As the memory medium 340, besides the various memory cards, for example, disk media using magnetism and light can be used.

The operation panel unit 350 includes input keys for a user to perform various instructions in performing photographing work with the imaging apparatus 400. The CPU 321 monitors an input signal from the operation panel unit 350 and executes various kinds of operation control on the basis of input content of the input signal.

The display 360 is a small display device such as a liquid crystal panel incorporated in the imaging apparatus 400. The display 360 displays a picked-up image.

If the solid-state imaging device 10 according to this embodiment is applied to such an imaging apparatus 400, it is possible to realize an increase in speed of the electronic shutter operation. Therefore, it is possible to suppress distortion from occurring in the image displayed on the display 360. This is advantageous in securing the quality of the picked-up image.

The present application contains subject matter related to that disclosed in Japanese Priority Patent Application JP 2009-150826 filed in the Japan Patent Office on Jun. 25, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
    a pixel area section in which plural pixels having photoelectric conversion sections, in which signal charges are accumulated, are arranged along a relative horizontal direction and a relative vertical direction;
    a vertical scanning unit that selects the pixels of the pixel area section in row units and reads out the signal charges from the pixels in row units; and
    an electronic shutter unit that supplies a reset signal set in a valid state and a transfer signal set in a valid state to the pixels in row units to reset all the pixels and, then, supplies the transfer signal set in an invalid state to the pixels in row units to release the reset of the pixels and starts accumulation of the signal charges in the pixels,
    wherein,
        the electronic shutter unit includes a transfer-signal generating circuit that generates a transfer signal to effect a transfer of charges on a row unit basis,
        the transfer-signal generating circuit includes a latch;
        the electronic shutter unit generates a shutter control signal, a set signal for the latch, and a reset signal for the latch,
        the latch is set by either the shutter control signal or the set signal for latch;
        the latch is reset by the reset signal for latch, and
        the transfer-signal generating circuit generates the transfer signal based on either the shutter control signal or an output signal of the latch.

2. A solid-state imaging device according to claim 1, wherein the reset of the pixels by the electronic shutter unit is simultaneously executed on all the pixels.

3. A solid-state imaging device according to claim 1, wherein the release of the reset of the pixels by the electronic shutter unit is sequentially executed on the pixels in row units.

4. A solid-state imaging device according to claim 1, wherein the release of the reset of the pixels by the electronic shutter unit is simultaneously executed on all the pixels.

5. An imaging apparatus comprising:
    an imaging unit including a solid-state imaging device;
    a control unit that controls the imaging unit; and
    an operation unit for operating the imaging unit,
    wherein,
        (a) the solid-stage imaging device includes
            a pixel area section in which plural pixels having photoelectric conversion sections, in which signal charges are accumulated, are arranged along a horizontal direction and a vertical direction,
            a vertical scanning unit that selects the pixels of the pixel area section in row units and reads out the signal charges from the pixels in row units, and
            an electronic shutter unit that supplies a reset signal set in a valid state and a transfer signal set in a valid state to the pixels in row units to reset all the pixels and, then, supplies the transfer signal set in an invalid state to the pixels in row units to release the reset of the pixels and starts accumulation of the signal charges in the pixels,
        (b) the electronic shutter unit includes a transfer-signal generating circuit that generates a transfer signal to effect a transfer of charges on a row unit basis,
        (c) the transfer-signal generating circuit includes a latch;
        (d) the electronic shutter unit generates a shutter control signal, a set signal for the latch, and a reset signal for the latch,
        (e) the latch is set by either the shutter control signal or the set signal for latch;
        the latch is reset by the reset signal for latch, and
        (f) the transfer-signal generating circuit generates the transfer signal based on either the shutter control signal or an output signal of the latch.

* * * * *